(12) United States Patent
Yamagishi et al.

(10) Patent No.: US 10,207,929 B2
(45) Date of Patent: Feb. 19, 2019

(54) CARBON NANOTUBE FILM AND METHOD FOR PRODUCING SAME (71) Applicant: ZEON CORPORATION, Chiyoda-ku, Tokyo (JP)

(72) Inventors: Tomoko Yamagishi, Tokyo (JP); Mitsugu Uejima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/538,372

(22) PCT Filed: Dec. 24, 2015

(86) PCT No.: PCT/JP2015/006442
§ 371 (c)(1),
(2) Date: Jun. 21, 2017

(87) PCT Pub. No.: WO2016/103706
PCT Pub. Date: Jun. 30, 2016

(65) Prior Publication Data
US 2017/0369319 A1   Dec. 28, 2017

(30) Foreign Application Priority Data

Dec. 25, 2014 (JP) ................................ 2014-262890

(51) Int. Cl.
C01B 32/166 (2017.01)
B82Y 40/00 (2011.01)
(Continued)

(52) U.S. Cl.
CPC ............ C01B 32/166 (2017.08); B82Y 40/00 (2013.01); C01B 32/05 (2017.08); H01B 1/04 (2013.01);
(Continued)

(58) Field of Classification Search
CPC . C01B 32/166; C01B 2202/32; C01B 31/022; C01B 31/0226; C01B 31/0233;
(Continued)

(56) References Cited

U.S. PATENT DOCUMENTS

2005/0058590 A1* 3/2005 Sen ..................... B82Y 10/00
423/447.1
2010/0221172 A1    9/2010 Maeda et al.

FOREIGN PATENT DOCUMENTS

CN    101691280 A    4/2010
CN    102351165 A    2/2012
(Continued)

OTHER PUBLICATIONS

Chikkannanavar, et al., Synthesis of Peapods Using Substrate-Grown SWNTs and DWNTs: An Enabling Step Toward Peapod Devices, Nano Letters 2005; 5(1): 151-155 (Year: 2005).*
(Continued)

Primary Examiner — Daniel McCracken
(74) Attorney, Agent, or Firm — Kenja IP Law PC (57) ABSTRACT A carbon nanotube film includes an assembly of a plurality of carbon nanotubes, wherein the plurality of carbon nanotubes includes one or more carbon nanotubes having at least partially collapsed structures. A method for producing a carbon nanotube film includes forming a carbon nanotube film by removing a solvent from a carbon nanotube dispersion liquid containing the solvent, a dispersant, and a plurality of carbon nanotubes including one or more carbon nanotubes having at least partially collapsed structures.

5 Claims, 2 Drawing Sheets (51) Int. Cl.
*H01B 1/04* (2006.01)
*H01B 5/02* (2006.01)
*H01B 13/00* (2006.01)
*C01B 32/05* (2017.01)

(52) U.S. Cl.
CPC .............. *H01B 5/02* (2013.01); *H01B 13/00* (2013.01); *C01B 2202/32* (2013.01)

(58) Field of Classification Search
CPC .............. C01B 31/024; C01B 31/0246; C01B 31/0253; C01B 31/026; C01B 31/0266; C01B 31/0273; C01B 31/028; C01B 31/0286; C01B 31/0293; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/34; C01B 2202/36; H01B 1/04; B82Y 40/00; B82Y 5/00; B82Y 10/00; B82Y 15/00; B82Y 20/00; B82Y 25/00; B82Y 30/00; B82Y 35/00; B82Y 99/00; D01F 9/10; D01F 9/127; D01F 9/1271; D01F 9/1272; D01F 9/1273; D01F 9/1274; D01F 9/1275; D01F 9/1276; D01F 9/1277; D01F 9/1278
See application file for complete search history.

(56) References Cited

FOREIGN PATENT DOCUMENTS

| CN | 104098084 A | 10/2014 |
| EP | 2178095 A1 | 7/2013 |
| EP | 3103901 A1 | 12/2016 |
| JP | 2010105909 A | 5/2010 |
| JP | 2011098876 A | 5/2011 |
| WO | 2009008486 A1 | 1/2009 |

OTHER PUBLICATIONS

Komarov F.F. et al, "Effects of surfactant and fabrication procedure on the electrical conductivity and electromagnetic shielding of single-walled carbon nanotube films", Physica Status Solidi A, Application and Materials Science, vol. 212, No. 2, pp. 425-432, Feb. 2015.

Mar. 22, 2016, International Search Report issued in the International Patent Application No. PCT/JP2015/006442.

Jun. 27, 2017, International Preliminary Report on Patentability issued in the International Patent Application No. PCT/JP2015/006442.

Aug. 14, 2018, the Extended European Search Report issued by the European Patent Office in the corresponding European Patent Application No. 15872277.7.

F. Hasi et al., "Thin films of C60 peapods and double wall carbon nanotubes", AIP Conference Proceedings, 2004, pp. 273-277, vol. 723, XP002783628.

* cited by examiner

FIG. 1

Collapsed structure

FIG. 2

FIG. 3A
Example 1

FIG. 3B
Comparative Example 2

FIG. 3C
Example 1

FIG. 3D
Comparative Example 2

CARBON NANOTUBE FILM AND METHOD FOR PRODUCING SAME

TECHNICAL FIELD

The present disclosure relates to a carbon nanotube film and a method for producing the same, and in particular relates to a carbon nanotube film including an assembly of a plurality of carbon nanotubes and a method for producing this carbon nanotube film.

BACKGROUND

In recent years, carbon nanotubes (hereinafter, also referred to as "CNTs") have been attracting attention as materials having excellent electrical conductivity, thermal conductivity, and mechanical characteristics.

However, CNTs are fine tubular structures having nanometer-size diameters, which makes handling and processing of individual CNTs difficult. In consideration of this, it has been proposed, for example, that a plurality of CNTs may be assembled into a film shape to form a carbon nanotube film (hereinafter, also referred to as a "CNT film"), which is sometimes also referred to as "buckypaper", and this CNT film may be used as a conductive film or the like. More specifically, it has been proposed that a CNT film formed by removing a solvent from a carbon nanotube dispersion liquid (hereinafter, also referred to as a "CNT dispersion liquid") containing the solvent and CNTs may be used as a component (for example, a conductive film or catalyst layer) of an electrode in a solar cell, touch panel, or the like. Such CNT films are attracting interest as film-shaped materials having excellent electrical conductivity, thermal conductivity, and mechanical characteristics.

However, there is demand for further improvement of properties of CNT films (for example, electrical conductivity, thermal conductivity, and mechanical characteristics). In order to improve such properties of CNT films, it is important to favorably assemble CNTs having excellent characteristics in high-density. In one example, PTL 1 proposes a technique for obtaining a high-density CNT film by forming a sheet using a highly-dispersed dispersion liquid obtained by applying a high pressure of 100 MPa to 280 MPa to a CNT dispersion liquid, and then performing rolling of the resultant CNT sheet with a pressing pressure of 0.01 ton/cm$^2$ to 100 ton/cm$^2$.

CITATION LIST

Patent Literature

PTL 1: JP 2010-105909 A

SUMMARY

Technical Problem

However, the conventional technique described above involves high-pressure treatment of a CNT dispersion liquid to break up CNT agglomerates and obtain a CNT sheet having excellent properties, and this high-pressure treatment of the CNT dispersion liquid may lead to damage or destruction of CNTs, which makes it difficult to obtain a CNT sheet having excellent properties. Consequently, it has not been possible to achieve excellent properties for a CNT film obtained through rolling of this CNT sheet.

An objective of the present disclosure is to provide a carbon nanotube film having excellent properties such as electrical conductivity, thermal conductivity, and mechanical characteristics.

Solution to Problem

The inventors conducted diligent investigation to achieve this objective. Through this investigation, the inventors discovered that a carbon nanotube film having excellent properties such as electrical conductivity, thermal conductivity, and mechanical characteristics can be obtained by forming the carbon nanotube film using carbon nanotubes among which at least some have a specific structure. This discovery led to the present disclosure.

Specifically, in order to beneficially solve the problem described above through the present disclosure, a presently disclosed carbon nanotube film includes an assembly of a plurality of carbon nanotubes, wherein the plurality of carbon nanotubes includes one or more carbon nanotubes having at least partially collapsed structures. As a result of the carbon nanotube film being formed using one or more carbon nanotubes having at least partially collapsed structures, the carbon nanotube film can be provided with excellent properties such as electrical conductivity, thermal conductivity, and mechanical characteristics.

In the presently disclosed carbon nanotube film, the one or more carbon nanotubes having at least partially collapsed structures are preferably present in a proportion of at least 5 in 100 carbon nanotubes. The reason for this is that when the one or more carbon nanotubes having at least partially collapsed structures are present in a proportion of at least 5 in 100 carbon nanotubes, properties such as electrical conductivity, thermal conductivity, and mechanical characteristics can be sufficiently improved.

In the presently disclosed carbon nanotube film, the plurality of carbon nanotubes preferably has a BET specific surface area of at least 600 m$^2$/g. The reason for this is that when the plurality of carbon nanotubes including the one or more carbon nanotubes having at least partially collapsed structures has a BET specific surface area of at least 600 m$^2$/g, properties such as electrical conductivity, thermal conductivity, and mechanical characteristics can be sufficiently improved.

The presently disclosed carbon nanotube film preferably has a film surface glossiness at 60° of at least 5 and no greater than 50. It is presumed that the one or more carbon nanotubes having at least partially collapsed structures are contained in a sufficient proportion when the glossiness is at least 5 and no greater than 50, which enables sufficient improvement of properties of the carbon nanotube film such as electrical conductivity, thermal conductivity, and mechanical characteristics.

Moreover, in order to beneficially solve the problem described above through the present disclosure, a presently disclosed method for producing a carbon nanotube film includes forming a carbon nanotube film by removing a solvent from a carbon nanotube dispersion liquid containing the solvent, a dispersant, and a plurality of carbon nanotubes including one or more carbon nanotubes having at least partially collapsed structures. The carbon nanotube film produced in this manner includes one or more carbon nanotubes having at least partially collapsed structures and has excellent properties such as electrical conductivity, thermal conductivity, and mechanical characteristics.

The presently disclosed method for producing a carbon nanotube film preferably further includes preparing the carbon nanotube dispersion liquid by subjecting a coarse dispersion liquid containing the plurality of carbon nanotubes, the dispersant, and the solvent to dispersion treatment that brings about a cavitation effect or a crushing effect in order to disperse the plurality of carbon nanotubes. The reason for this is that when the carbon nanotube dispersion liquid is prepared by dispersion treatment that brings about a cavitation effect or a crushing effect, properties of the produced carbon nanotube film such as electrical conductivity, thermal conductivity, and mechanical characteristics can be sufficiently improved.

The presently disclosed carbon nanotube film described above can be favorably produced by the presently disclosed method for producing a carbon nanotube film described above.

Advantageous Effect

According to the present disclosure, a carbon nanotube film can be provided that has excellent properties such as electrical conductivity, thermal conductivity, and mechanical characteristics.

DETAILED DESCRIPTION

The following provides a detailed description of embodiments of the present disclosure.

A presently disclosed carbon nanotube film includes one or more carbon nanotubes having at least partially collapsed structures. The presently disclosed carbon nanotube film can be produced by a presently disclosed method for producing a carbon nanotube film.

(Carbon Nanotube Film)

The presently disclosed carbon nanotube film is composed of a carbon nanotube (CNT) assembly formed by assembling a plurality of CNTs into a film shape. One main feature of the presently disclosed CNT film is that all or some of the CNTs composing the assembly are carbon nanotubes having at least partially collapsed structures (hereinafter, also referred to as "collapsed CNTs"). The presently disclosed CNT film has excellent properties such as electrical conductivity, thermal conductivity, and mechanical characteristics as a result of including one or more collapsed CNTs.

The presently disclosed carbon nanotube film may be a film formed on a support such as a substrate (i.e., a supported film), or may be a free-standing film.

Although it is not clear why properties of the CNT film are improved as a result of one or more collapsed CNTs being included among the plurality of CNTs that is used, the reason is presumed to be as follows. Specifically, it is presumed that CNTs can assemble more favorably, without performing additional processing such as pressing, when one or more collapsed CNTs are used compared to when only CNTs not having collapsed structures are used. Moreover, it is presumed that properties of the CNT film are improved due to the collapsed CNTs themselves having excellent characteristics.

<Carbon Nanotubes>

The plurality of CNTs that compose the CNT film are required to include one or more collapsed CNTs. It is presumed that collapsed CNTs can display excellent characteristics when used in a CNT film or the like as a result of the collapsed CNTs having a different structure to normal circular tube-shaped CNTs in terms of external shape and internal space.

[Carbon Nanotube Having at Least Partially Collapsed Structure]

Herein, when a CNT is described as "having an at least partially collapsed structure", this refers to the fact that when such a CNT is sealed in a quartz tube with fullerenes (C60) and is subjected to heat treatment at reduced pressure (fullerene insertion treatment), the resultant fullerene inserted-CNT, when observed using a transmission electron microscope (TEM), has a section in which fullerenes are not inserted.

Figure 1:
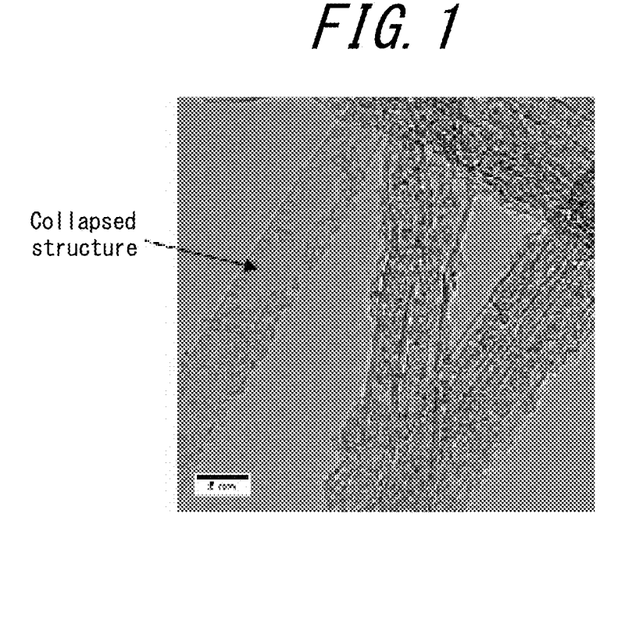
FIG. 1 is a TEM image of CNTs after being subjected to fullerene insertion treatment.
Figure 2:
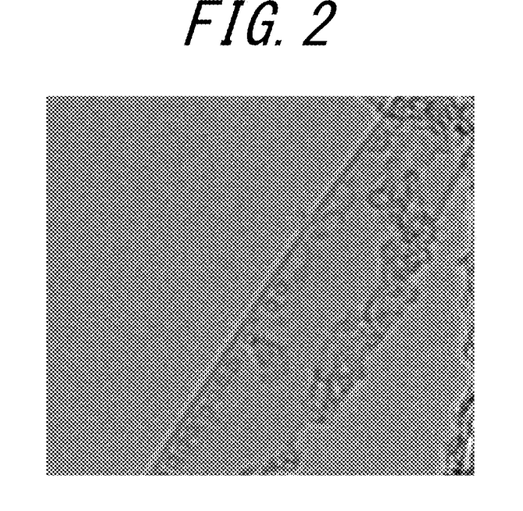
FIG. 2 is an enlarged image illustrating an enlargement of part of the TEM image in FIG. 1.

For example, in proximity to a location indicated by an arrow in a TEM image in FIG. 1, which is enlarged in FIG. 2, fullerenes are only inserted at opposite edges of the imaged CNT in a width direction (i.e., direction perpendicular to an extension direction of the CNT) and are not inserted other than at the edges. Accordingly, it can be determined that the section in which fullerenes are not inserted is collapsed, and that the CNT therefore has a collapsed structure.

It should be noted that with regards to a "CNT having an at least partially collapsed structure", one "collapsed structure" or a plurality of "collapsed structures" may be present in a single CNT.

The "CNT having an at least partially collapsed structure" is preferably a carbon nanotube that is a tube formed by rolled up graphene that has at least a section where cross-sectional shape perpendicular to an extension direction (axial direction) of the tube is non-circular. The cross-sectional shape of the collapsed CNT is more preferably a shape in which the maximum width in a direction perpendicular to a longitudinal direction of the cross-section is greater in proximity to both longitudinal direction edges of the cross-section than in proximity to a longitudinal direction central part of the cross-section, and is particularly preferably a dumbbell shape (i.e., a shape in which the longitudinal direction central part of the cross-section is collapsed).

With regards to cross-sectional shape of the collapsed CNT, "in proximity to a longitudinal direction central part of the cross-section" refers to a region within 30% of cross-section longitudinal direction length of a longitudinally central line in the cross-section (i.e., a straight line running centrally through the cross-section in terms of the longitudinal direction and perpendicularly intersecting a longitudinal direction line), and "in proximity to a longitudinal direction edge of the cross-section" refers to a region further outward in the longitudinal direction than "in proximity to a longitudinal direction central part of the cross-section".

The inventors presume, based on their research, that such a collapsed CNT has an at least partially collapsed structure from the point of synthesis and thus has significantly different properties to a normal carbon nanotube having a circular tube-shaped structure or a carbon nanotube that does not have a collapsed structure from the point of synthesis but that has undergone structural deformation after being formed with a circular tube-shaped structure. Specifically, it is presumed that a collapsed CNT according to the present disclosure is a material formed by a network of six member rings in which carbon atoms are $sp^2$ bonded to one another such as to have a "collapsed structure" as described above, and this material is considered to be a novel material different from any commonly known structures composed of carbon.

Herein, an average width of collapsed sections in the one or more collapsed CNTs (i.e., sections in which fullerenes are not inserted in fullerene insertion treatment) is preferably at least 5 nm and no greater than 9 nm. The reason for this is that when the average width of the collapsed sections in the CNTs is at least 5 nm and no greater than 9 nm, properties of the CNT film can be further improved.

In the present disclosure, the "average width of collapsed sections in the CNTs" is an arithmetic mean value obtained by measuring the lengths of collapsed sections in a CNT width direction with respect to 10 random CNTs having collapsed structures using a transmission electron microscope. The lengths in the width direction of the collapsed CNTs are preferably distributed in a range from 1 nm to 10 nm.

[Plurality of Carbon Nanotubes]

The plurality of CNTs that include the previously described one or more collapsed CNTs and that compose the CNT film may, without any specific limitations, have a single-walled structure or a multi-walled structure, but preferably have a single-walled structure. In other words, the plurality of CNTs including the one or more collapsed CNTs are preferably single-walled carbon nanotubes.

In a Raman spectrum of the plurality of CNTs, a ratio of G band peak intensity relative to D band peak intensity (G/D ratio) is preferably at least 1, and is preferably no greater than 50, and more preferably no greater than 10. A G/D ratio of no greater than 10 indicates that a large number of amorphous locations are present. The G/D ratio is an index commonly used to evaluate the quality of CNTs. In a Raman spectrum of CNTs measured by a Raman spectrometer, vibration modes referred to as a G band (near 1600 cm$^{-1}$) and a D band (near 1350 cm$^{-1}$) are observed. The G band is a vibration mode based on hexagonal lattice structure of graphite and the D band is a vibration mode based on amorphous locations. CNTs having a high ratio of G band and D band peak intensities (G/D ratio) can be evaluated as having high crystallinity.

A BET specific surface area of the plurality of CNTs is preferably at least 600 m$^2$/g, and more preferably at least 800 m$^2$/g, and is preferably no greater than 1,400 m$^2$/g, and more preferably no greater than 1,200 m$^2$/g. The reason for this is that when the BET specific surface area of the plurality of CNTs is at least 600 m$^2$/g, properties of the CNT film can be sufficiently improved. Furthermore, when the BET specific surface area of the plurality of CNTs is no greater than 1,400 m$^2$/g, the negative effect of CNT agglomeration on properties of the CNT film can be suppressed.

Note that the "BET specific surface area" can be determined by the BET method through measurement of a nitrogen adsorption isotherm at 77 K. Herein, the BET specific surface area can be measured using, for example, a BELSORP®-max (BELSORP is a registered trademark in Japan, other countries, or both) produced by MicrotracBEL Corp.

The length of the plurality of CNTs at the time of production is preferably at least 100 μm and no greater than 5,000 μm.

The plurality of CNTs preferably includes the one or more collapsed CNTs in a proportion of at least 5 collapsed CNTs per 100 CNTs, more preferably in a proportion of at least 10 collapsed CNTs per 100 CNTs, further preferably in a proportion of at least 20 collapsed CNTs per 100 CNTs, and particularly preferably in a proportion of at least 30 collapsed CNTs per 100 CNTs. The reason for this is that when the collapsed CNTs are contained in a proportion of at least 5 in 100 CNTs, properties of the CNT film can be sufficiently improved.

In the present disclosure, the "proportion of collapsed CNTs" can be determined by observing 100 random CNTs using a transmission electron microscope and counting the number of collapsed CNTs present among the 100 CNTs.

[Production Method of Plurality of Carbon Nanotubes]

The plurality of CNTs including the one or more collapsed CNTs can be produced by synthesizing a plurality of CNTs that includes collapsed CNTs or can be produced by separately synthesizing collapsed CNTs and generic CNTs (circular tube-shaped CNTs), and subsequently mixing the collapsed CNTs and the generic CNTs.

The following describes, as one example, a production method in which a plurality of CNTs that includes one or more collapsed CNTs is synthesized.

The production method in which the plurality of CNTs that includes one or more collapsed CNTs is synthesized makes use of a CVD method and specifically includes at least:

(1) a step of applying a coating liquid A containing an aluminum compound onto a substrate;

(2) a step of drying the coating liquid A to form an aluminum thin film on the substrate;

(3) a step of applying a coating liquid B containing an iron compound onto the aluminum thin film;

(4) a step of drying the coating liquid B at a temperature of no higher than 50° C. to form an iron thin film on the aluminum thin film and thereby obtain a catalyst substrate; and (5) a step of growing carbon nanotubes on the catalyst substrate by supplying a feedstock gas to the catalyst substrate (growth step).

The term "aluminum thin film" refers to a thin film containing aluminum as a metal component and the term "iron thin film" refers to a thin film containing iron as a metal component. Hereinafter, steps (1) and (2) are collectively referred to as a "catalyst supporting layer formation step" and steps (3) and (4) are collectively referred to as a "catalyst layer formation step".

According to the production method described above, as a result of the catalyst substrate being prepared by a wet process and the drying temperature when obtaining the catalyst layer by drying being no higher than 50° C., CNTs that include one or more collapsed CNTs can be produced from initial production.

—Catalyst Supporting Layer Formation Step—

First, the coating liquid A containing the aluminum compound is applied onto the substrate and is dried to form the aluminum thin film on the substrate. The aluminum thin film formed on the substrate as described above functions as a catalyst supporting layer on which the iron thin film (catalyst layer) explained below is supported.

Substrate

The substrate used for the catalyst substrate is for example a flat plate-shaped member and can preferably maintain shape up to a high temperature of at least 500° C. Specific examples of the substrate include metals such as iron, nickel, chromium, molybdenum, tungsten, titanium, aluminum, manganese, cobalt, copper, silver, gold, platinum, niobium, tantalum, lead, zinc, gallium, indium, germanium, and antimony, alloys and oxides including these metals, non-metals such as silicon, quartz, glass, mica, graphite, and diamond, and ceramics. Metal materials are preferable due to their low cost and ease of processing compared to silicon and ceramics, and particularly suitable examples include Fe—Cr (iron-chromium) alloy, Fe—Ni (iron-nickel) alloy, and Fe—Cr—Ni (iron-chromium-nickel) alloy.

No specific limitations are placed on the thickness of the substrate, which can for example range from a thin film having a thickness of several micrometers to a plate having a thickness of several centimeters. The thickness of the substrate is preferably at least 0.05 mm and no greater than 3 mm.

Although no specific limitations are placed on the area of the substrate, the area is preferably at least 20 cm$^2$, and more preferably at least 30 cm$^2$. The shape of the substrate can for example be rectangular or square, but is not specifically limited.

—Coating Liquid A—

The coating liquid A is a liquid in which the aluminum compound is dissolved or dispersed in an organic solvent. No specific limitations are placed on the aluminum compound contained in the coating liquid A other than being a compound that includes an aluminum atom. The aluminum compound is preferably an organometallic compound or metal salt that can be used to form an alumina thin film as the aluminum thin film.

Examples of organometallic compounds that can be used to form an alumina thin film include aluminum alkoxides such as aluminum trimethoxide, aluminum triethoxide, aluminum tri-n-propoxide, aluminum tri-i-propoxide, aluminum tri-n-butoxide, aluminum tri-sec-butoxide, and aluminum tri-tert-butoxide. Other examples of aluminum-containing organometallic compounds include complexes such as tris(acetylacetonato)aluminum(III). Examples of metal salts that can be used to form an alumina thin film include aluminum sulfate, aluminum chloride, aluminum nitrate, aluminum bromide, aluminum iodide, aluminum lactate, basic aluminum chloride, and basic aluminum nitrate. Any of such examples can be used individually or as a mixture.

Various organic solvents such as alcohols, glycols, ketones, ethers, esters, and hydrocarbons can be used as the organic solvent contained in the coating liquid A. However, an alcohol or a glycol is preferably used as the solvent because organometallic compounds and metal salts have good solubility therein. These organic solvents may be used individually or as a mixture of two or more types of organic solvents. Examples of alcohols that are preferable in terms of handleability and preservation stability include methanol, ethanol, and isopropyl alcohol.

A stabilizer may be added to the coating liquid A in order to suppress a condensation polymerization reaction of the organometallic compound and metal salt. The stabilizer is preferably at least one selected from the group consisting of β-diketones and alkanolamines. Examples of β-diketones that can be used include acetylacetone, methyl acetoacetate, ethyl acetoacetate, benzoylacetone, dibenzoylmethane, benzoyltrifluoroacetone, furoylacetone, and trifluoroacetylacetone, with acetylacetone and ethyl acetoacetate being particularly preferable. Examples of alkanolamines that can be used include monoethanolamine, diethanolamine, triethanolamine, N-methyldiethanolamine, N-ethyldiethanolamine, N,N-dimethylaminoethanol, diisopropanolamine, and triisopropanolamine, with a secondary or tertiary alkanolamine being preferable.

Although no specific limitations are placed on the amount of the aluminum compound in the coating liquid A, the amount per 100 mL of the organic solvent is preferably at least 0.1 g, and more preferably at least 0.5 g, and is preferably no greater than 30 g, and more preferably no greater than 5 g.

Furthermore, although no specific limitations are placed on the amount of the stabilizer in the coating liquid A, the amount per 100 mL of the organic solvent is preferably at least 0.01 g, and more preferably at least 0.1 g, and is preferably no greater than 20 g, and more preferably no greater than 3 g.

—Application—

The coating liquid A described above is applied onto the substrate. No specific limitations are placed on the method by which the coating liquid A is applied onto the substrate. Although the coating liquid A can for example be applied by a method involving application by spraying or brushing, or by spin coating, dip coating, or the like, dip coating is preferable from a viewpoint of productivity and film thickness control.

Dip coating is a method in which an application target (in this case, the coating liquid A) is applied onto the surface of a substrate by immersing the substrate in the application target for a fixed time and subsequently pulling up the substrate.

—Drying—

Next, the coating liquid A is dried on the substrate to form the aluminum thin film (catalyst supporting layer) on the substrate. Although no specific limitations are placed on the method by which the coating liquid A is dried on the substrate, the coating liquid A can for example be dried by air drying at room temperature or by heating (sintering process), with heating being preferable. The heating temperature is preferably approximately 50° C. to 400° C., and is more preferably no higher than 350° C. The heating time is preferably at least 5 minutes and no greater than 60 minutes, and is more preferably no greater than 40 minutes.

—Catalyst Layer Formation Step—

Next, the coating liquid B containing the iron compound is applied onto the aluminum thin film formed in the catalyst supporting layer formation step, and is dried at a temperature of no higher than 50° C. to form the iron thin film on the aluminum thin film. As a result of this step, the catalyst substrate having the aluminum thin film (catalyst supporting layer) and the iron thin film (catalyst layer) on the substrate can be obtained.

Coating Liquid B

The coating liquid B is a liquid in which the iron compound is dissolved or dispersed in an organic solvent. No specific limitations are placed on the iron compound contained in the coating liquid B other than being a compound that includes an iron atom. The iron compound is preferably an organometallic compound or metal salt that can be used to form an iron thin film.

Examples of organometallic compounds that can be used to form an iron thin film include iron pentacarbonyl, ferrocene, iron(II) acetylacetonate, iron(III) acetylacetonate, iron (II) trifluoroacetylacetonate, and iron(III) trifluoroacetylacetonate. Examples of metal salts that can be used to form an iron thin film include inorganic acid iron salts such as iron sulfate, iron nitrate, iron phosphate, iron chloride, and iron bromide, and organic acid iron salts such as iron acetate, iron oxalate, iron citrate, and iron lactate. From among these examples, use of an organic acid iron salt is preferable. These examples can be used individually or as a mixture.

No specific limitations are placed on the organic solvent contained in the coating liquid B. The organic solvent can be any of the organic solvents described in the previous section relating to the coating liquid A. Moreover, the coating liquid B may contain any of the stabilizers described in the previous section relating to the coating liquid A.

Although no specific limitations are placed on the amount of the iron compound in the coating liquid B, the amount per 100 mL of the organic solvent is preferably at least 0.05 g, and more preferably at least 0.1 g, and is preferably no greater than 5 g, and more preferably no greater than 1 g.

Furthermore, although no specific limitations are placed on the amount of the stabilizer in the coating liquid B, the amount per 100 mL of the organic solvent is preferably at least 0.05 g, and more preferably at least 0.1 g, and is preferably no greater than 5 g, and more preferably no greater than 1 g.

—Application—

No specific limitations are placed on the method by which the coating liquid B is applied onto the aluminum thin film. The coating liquid B can be applied by any of the methods described in the previous section relating to the catalyst supporting layer formation step.

In the same way as for application of the coating liquid A in the previously described catalyst supporting layer formation step, dip coating is preferably used as the application method of the coating liquid B.

In a situation in which dip coating is used, the immersion time of the aluminum thin film-equipped substrate in the coating liquid B is preferably 1 s to 30 s. Furthermore, the pulling up speed of the substrate from the coating liquid B after immersion is preferably 1 mm/s to 5 mm/s. If the pulling up speed is greater than 5 mm/s, there may be insufficient adhesion of the coating liquid B to the substrate and the proportion of collapsed CNTs in the obtained CNTs may be reduced.

—Drying—

Next, the coating liquid B is dried on the aluminum thin film to form the iron thin film on the substrate. Herein, it is necessary to perform drying of the coating liquid B at no higher than 50° C., preferably no higher than 40° C., and more preferably no higher than 30° C. If the drying temperature is higher than 50° C., it is not possible to synthesize CNTs that include one or more collapsed CNTs in the following growth step. Although no specific limitations are placed on the lower limit for the drying temperature, the drying temperature is normally at least 10° C. Furthermore, it is normally preferable that the method by which the coating liquid B is dried on the substrate is air drying. Drying may be performed by heating so long as the drying temperature is no higher than 50° C. However, air drying is more suitable from a viewpoint of efficiently producing collapsed CNTs.

—Formation Step—

In the production method of the CNTs that include one or more collapsed CNTs, a formation step is preferably carried out before the growth step. The formation step is a step of providing a reducing gas (reductive gas) environment as an environment around the catalyst and heating either or both of the catalyst and the reducing gas. The formation step brings about one or more effects among reduction of the catalyst, promotion of micronization of the catalyst to a state suitable for CNT growth, and improvement of catalyst activity. For example, in a situation in which the catalyst substrate includes an alumina-iron thin film composed of an alumina thin film and an iron thin film, the iron catalyst is reduced and micronized such that a large number of nanometer-size iron fine particles are formed on the alumina thin film (catalyst supporting layer). As a result, the iron thin film (catalyst layer) is placed in a suitable state for CNT production. Although CNTs can be produced even if the formation step is omitted, the amount and quality of CNTs that are produced can be dramatically improved by carrying out the formation step.

Reducing Gas

Examples of gases that can be used as the reducing gas in the formation step include hydrogen gas, ammonia, water vapor, and mixed gases thereof. Furthermore, the reducing gas may be a mixed gas obtained by mixing hydrogen gas with an inert gas such as helium gas, argon gas, or nitrogen gas. The reducing gas may be used in the formation step, and may be used in the growth step as appropriate.

The temperature of the catalyst and/or the reducing gas in the formation step is preferably at least 400° C. and no higher than 1100° C. The duration of the formation step is preferably at least 3 minutes and no greater than 20 minutes, and is more preferably at least 3 minutes and no greater than 10 minutes. Through the above, it is possible to suppress reduction in thickness of the iron thin film (catalyst layer) due to sintering proceeding during the formation step.

—Growth Step—

Next, a feedstock gas is supplied to the catalyst substrate that has been obtained through the catalyst supporting layer formation step and the catalyst layer formation step, and carbon nanotubes (i.e., an aligned CNT aggregate) are grown on the catalyst substrate.

Either or both of the catalyst layer and the feedstock gas are normally heated in the growth step. However, from a viewpoint of growing CNTs with uniform density, it is preferable that at least the feedstock gas is heated. The heating temperature is preferably 400° C. to 1100° C. The growth step is carried out by introducing the feedstock gas, an inert gas, and optionally either or both of a reducing gas and a catalyst activating material into a CNT growth furnace housing the catalyst substrate.

From a viewpoint of increasing CNT production efficiency, it is preferable that the reducing gas and the feedstock gas are supplied to the catalyst on the catalyst substrate by a gas shower.

Feedstock Gas

The feedstock gas is a carbon source-containing material that is a gas at the temperature of CNT growth. Among such gases, hydrocarbons such as methane, ethane, ethylene, propane, butane, pentane, hexane, heptane, propylene, and acetylene are suitable. Other examples include low-carbon number oxygen-containing compounds such as acetone, carbon monoxide, and lower alcohols such as methanol and ethanol. Mixtures of any of the above examples can also be used.

Inert Gas

The feedstock gas may be diluted with an inert gas. The inert gas is a gas that is inert at the temperature of CNT growth and that does not react with the grown CNTs, and is preferably a gas that does not reduce activity of the catalyst. Examples of inert gases that can be used include noble gases such as helium, argon, neon, and krypton; nitrogen; hydrogen; and mixed gases of any of these gases.

Catalyst Activating Material

A catalyst activating material may be added in the CNT growth step. CNT production efficiency and purity can be further improved through addition of the catalyst activating material. The catalyst activating material used herein is typically an oxygen-containing material and is preferably a material that does not cause significant damage to CNTs at the temperature of CNT growth. Examples of effective catalyst activating materials include water, oxygen, ozone, acidic gases, nitrogen oxide, and low-carbon number oxygen-containing compounds such as carbon monoxide and carbon dioxide; alcohols such as ethanol and methanol; ethers such as tetrahydrofuran; ketones such as acetone; aldehydes; esters; and mixtures of any of these materials. Among these examples, water, oxygen, carbon dioxide, carbon monoxide, and ethers are preferable, and water is particularly suitable.

Although no specific limitations are placed on the volume concentration of the catalyst activating material, a trace amount is preferable. For example, in a situation in which the catalyst activating material is water, the volume concentration in a gas introduced into the furnace is normally from 10 ppm to 10,000 ppm, and preferably from 50 ppm to 1,000 ppm.

Other Conditions

Pressure in the reaction furnace and process time in the growth step are appropriately set in consideration of other conditions. For example, the pressure can be approximately $1 \times 10^2$ Pa to $1 \times 10^7$ Pa and the process time can be approximately 1 minute to 60 minutes.

—Cooling Step—

The production method for CNTs that include one or more collapsed CNTs preferably includes a cooling step after the growth step. The cooling step is a step in which the aligned CNT aggregate and the catalyst substrate are cooled in the presence of a cooling gas after the growth step. After the growth step, the aligned CNT aggregate and the catalyst substrate are at a high temperature, and therefore may oxidize upon being placed in the presence of oxygen. In order to prevent such oxidation, the aligned CNT aggregate and the catalyst substrate are cooled in the presence of a cooling gas to, for example, 400° C. or lower, and more preferably to 200° C. or lower. The cooling gas is preferably an inert gas and is particularly preferably nitrogen in terms of safety, cost, and so forth.

—Peeling Step—

The production method for CNTs that include one or more collapsed CNTs preferably includes a step in which the aligned CNT aggregate formed on the catalyst substrate is peeled from the catalyst substrate (peeling step). The aligned CNT aggregate can be peeled from the catalyst substrate physically, chemically, or mechanically. Examples of methods that can be used include peeling by an electric field, a magnetic field, centrifugal force, or surface tension; direct mechanical peeling from the substrate; and peeling from the substrate by pressure or heating. One example of a simple peeling method involves peeling from the catalyst substrate by direct pinching using tweezers. In a more suitable example, the aligned CNT aggregate can be cut away from the catalyst substrate using a thin blade such as a cutter blade. In another example, the aligned CNT aggregate can be sucked and peeled from the catalyst substrate using a vacuum pump or cleaner. Note that the catalyst remains on the substrate after peeling of the CNTs and can be reused to once again grow perpendicularly oriented CNTs.

—Production Apparatus—

No specific limitations are placed on the production apparatus used in the CNT production method described above other than being an apparatus that includes a growth furnace (reaction chamber) for housing the catalyst substrate and that can be used to grow CNTs by CVD. For example, the production apparatus can be a thermal CVD furnace or an MOCVD reaction furnace.

The carbon purity of the CNTs obtained by the above-described production method, without carrying out purification treatment, is preferably at least 98 mass %, more preferably at least 99 mass %, and particularly preferably at least 99.9 mass %. Purification treatment may optionally be carried out. The carbon purity can be determined through elemental analysis by X-ray fluorescence.

<Carbon Nanotube Film Properties>

Herein, the carbon nanotube film including the assembly of the plurality of CNTs described above preferably has the following properties.

[Carbon Nanotube Content]

The presently disclosed CNT film is preferably composed of at least 75 mass % of CNTs and more preferably does not include other components besides incidental impurities that are mixed in during production. The reason for this is that when the CNT content is at least 75 mass %, characteristics of the CNTs can be favorably expressed, and properties of the CNT film such as electrical conductivity, thermal conductivity, and mechanical characteristics can be sufficiently improved.

[Glossiness]

The film surface glossiness at 60° of the presently disclosed CNT film is preferably at least 5, more preferably at least 10, and even more preferably at least 20, and is preferably no greater than 50. The reason for this is presumed to be that collapsed CNTs are contained in a sufficient proportion when the glossiness of the CNT film is at least 5 and no greater than 50, and this enables sufficient improvement of properties of the CNT film such as electrical conductivity, thermal conductivity, and mechanical characteristics.

The glossiness of the CNT film can be measured in accordance with JIS Z8741 at an incident angle of 60°. The glossiness of the CNT film can be adjusted by altering the type and amount of CNTs used to form the CNT film, the preparation method of a CNT dispersion liquid used to form the CNT film, and so forth.

[Density]

The density of the presently disclosed CNT film is preferably at least 0.4 g/cm$^3$, more preferably at least 0.6 g/cm$^3$, and even more preferably at least 0.7 g/cm$^3$, and is preferably no greater than 1.0 g/cm$^3$.

In the present disclosure, the density of the carbon nanotube film can be determined by measuring the mass, area, and thickness of the CNT film, and then dividing the mass of the CNT film by the volume of the CNT film.

[Free-Standing Ability]

The presently disclosed CNT film is preferably a free-standing film that can maintain shape as a film even when a support is not present. Specifically, it is more preferable that the presently disclosed CNT film can maintain shape as a film without a support when the size thereof is 10 nm to 3 μm in thickness and 1 mm$^2$ to 100 cm$^2$ in area.

(Carbon Nanotube Film Production Method)

The presently disclosed method for producing a carbon nanotube film can be used to produce the presently disclosed carbon nanotube film described above. One main feature of the presently disclosed method for producing a CNT film is that the method includes a step (film formation step) of forming a carbon nanotube film by removing a solvent from a carbon nanotube dispersion liquid (CNT dispersion liquid) containing the solvent, a dispersant, and a plurality of CNTs including one or more CNTs having at least partially collapsed structures. The presently disclosed method for a producing a CNT film may further include, prior to the film formation step, a step (dispersion liquid preparation step) of preparing the CNT dispersion liquid by subjecting a coarse dispersion liquid containing the plurality of CNTs, the dispersant, and the solvent to dispersion treatment.

A CNT film obtained through the presently disclosed method for producing a CNT film has excellent properties such as electrical conductivity, thermal conductivity, and mechanical characteristics as a result of the CNT film including the one or more collapsed CNTs.

<Dispersion Liquid Preparation Step>

In the dispersion liquid preparation step, the CNT dispersion liquid is preferably prepared by subjecting a coarse dispersion liquid containing the plurality of carbon nanotubes, the dispersant, and the solvent to dispersion treatment that brings about a cavitation effect or a crushing effect in order to disperse the carbon nanotubes. The reason for this is that a CNT dispersion liquid in which CNTs are favorably dispersed can be obtained by using dispersion treatment that brings about a cavitation effect or a crushing effect. Furthermore, when a CNT film is produced using the CNT dispersion liquid in which the CNTs are favorably dispersed, CNTs having excellent characteristics can be caused to uniformly assemble so that the resultant CNT film has excellent properties such as electrical conductivity, thermal conductivity, and mechanical characteristics.

The CNT dispersion liquid used in the presently disclosed method for producing a CNT film can alternatively be prepared by dispersing the CNTs in the solvent using a different dispersion treatment method to those described above. Moreover, known additives such as fillers, stabilizers, colorants, charge control agents, lubricants, and the like may be blended into the CNT dispersion liquid depending on the intended use of the produced CNT film.

[Carbon Nanotubes]

The CNTs used to prepare the CNT dispersion liquid can be the previously described plurality of CNTs including one or more collapsed CNTs.

[Dispersant]

No specific limitations are placed on the dispersant used to prepare the CNT dispersion liquid other than being a dispersant that can disperse the CNTs and that is soluble in the solvent described further below. The dispersant can be a surfactant, a synthetic polymer, or a natural polymer.

Examples of surfactants that can be used include sodium dodecylsulfonate, sodium deoxycholate, sodium cholate, and sodium dodecylbenzenesulfonate.

Examples of synthetic polymers that can be used include polyether diols, polyester diols, polycarbonate diols, polyvinyl alcohols, partially saponified polyvinyl alcohols, acetoacetyl group-modified polyvinyl alcohols, acetal group-modified polyvinyl alcohols, butyral group-modified polyvinyl alcohols, silanol group-modified polyvinyl alcohols, ethylene-vinyl alcohol copolymers, ethylene-vinyl alcohol-vinyl acetate copolymer resins, polydimethylaminoethyl acrylates, polydimethylaminoethyl methacrylates, acrylic resins, epoxy resins, modified epoxy resins, phenoxy resins, modified phenoxy resins, phenoxyether resins, phenoxyester resins, fluorine-containing resins, melamine resins, alkyd resins, phenolic resins, polyacrylamides, polyacrylic acids, polystyrene sulfonic acids, polyethylene glycols, and polyvinyl pyrrolidones.

Furthermore, examples of natural polymers that can be used include polysaccharides such as starch, pullulan, dextran, dextrin, guar gum, xanthan gum, amylose, amylopectin, alginic acid, gum arabic, carrageenan, chondroitin sulfate, hyaluronic acid, curdlan, chitin, chitosan, and cellulose, and salts and derivatives thereof. The term "derivatives" refers to conventional commonly known compounds such as esters and ethers.

Any one of these dispersants can be used or two or more of these dispersants can be used as a mixture. From among such examples, the dispersant is preferably a surfactant, and is particularly preferably sodium deoxycholate or like, due to such dispersants exhibiting excellent dispersing ability toward CNTs.

[Solvent]

No specific limitations are placed on the solvent of the CNT dispersion liquid. The solvent may for example be water; an alcohol such as methanol, ethanol, n-propanol, isopropanol, n-butanol, isobutanol, t-butanol, pentanol, hexanol, heptanol, octanol, nonanol, decanol, or amyl alcohol; a ketone such as acetone, methyl ethyl ketone, or cyclohexanone; an ester such as ethyl acetate or butyl acetate; an ether such as diethyl ether, dioxane, or tetrahydrofuran; an amide-based polar organic solvent such as N,N-dimethylformamide or N-methylpyrrolidone; or an aromatic hydrocarbon such as toluene, xylene, chlorobenzene, ortho-dichlorobenzene, or para-dichlorobenzene. One of such solvents may be used individually or two or more of such solvents may be used as a mixture.

[Dispersion Treatment]

In the dispersion liquid preparation step, a carbon nanotube dispersion liquid is prepared by subjecting a coarse dispersion liquid, made by adding the above described CNTs and dispersant into the solvent, to dispersion treatment that brings about a cavitation effect or dispersion treatment that brings about a crushing effect in order to disperse the CNTs. The dispersion treatment that brings about a cavitation effect and the dispersion treatment that brings about a crushing effect are described below in detail.

—Dispersion Treatment that Brings About Cavitation Effect—

The dispersion treatment that brings about a cavitation effect is a dispersion method that utilizes shock waves caused by the rupture of vacuum bubbles formed in water when high energy is applied to the liquid. This dispersion method can be used to favorably disperse the CNTs.

Herein, specific examples of dispersion treatments that bring about a cavitation effect include dispersion treatment using ultrasound, dispersion treatment using a jet mill, and dispersion treatment using high-shear stirring. One of these dispersion treatments may be carried out or a plurality of these dispersion treatments may be carried out in combination. More specifically, an ultrasonic homogenizer, a jet mill, or a high-shear stirring device can for example be suitably used. Conventional commonly known devices may be used as the aforementioned devices.

In a situation in which the CNTs are dispersed using an ultrasonic homogenizer, the coarse dispersion liquid is irradiated with ultrasound by the ultrasonic homogenizer. The irradiation time should be set as appropriate in consideration of the amount of CNTs and so forth, and is for example preferably at least 3 minutes, and more preferably at least 30 minutes, and is preferably no greater than 5 hours, and more preferably no greater than 2 hours. Furthermore, the power is for example preferably at least 20 W and no greater than 500 W, and is more preferably at least 100 W and no greater than 500 W. The temperature is for example preferably at least 15° C. and no higher than 50° C.

In a situation in which a jet mill is used, the number of treatment repetitions carried out should be set as appropriate in consideration of the amount of CNTs and so forth, and is for example preferably at least 2 repetitions, and more preferably at least 5 repetitions, and is preferably no greater than 100 repetitions, and more preferably no greater than 50 repetitions. Furthermore, the pressure is for example preferably at least 20 MPa and no higher than 250 MPa, and the temperature is for example preferably at least 15° C. and no higher than 50° C.

In a situation in which high-shear stirring is used, the coarse dispersion liquid is subjected to stirring and shearing using a high-shear stirring device. The rotational speed is preferably as fast as possible. Furthermore, the operating time (i.e., the time that the device is rotating) is for example preferably at least 3 minutes and no greater than 4 hours, the circumferential speed is for example preferably at least 5 m/s and no greater than 50 m/s, and the temperature is for example preferably at least 15° C. and no higher than 50° C.

It should be noted that the above-described dispersion treatment that brings about a cavitation effect is more preferably carried out at a temperature of no higher than 50° C. The reason for this is in order to suppress change in concentration that occurs due to volatilization of the solvent.

—Dispersion Treatment that Brings about Crushing Effect—

Dispersion treatment that brings about a crushing effect is even more beneficial because in addition to of course enabling uniform dispersion of the CNTs in the solvent, dispersion treatment that brings about a crushing effect can also suppress damage to the CNTs due to shock waves when air bubbles burst compared to dispersion treatment that brings about a cavitation effect.

The dispersion treatment that brings about a crushing effect can uniformly disperse the CNTs in the solvent by causing crushing and dispersion of CNT agglomerates by imparting shear force on the coarse dispersion liquid and by further applying back pressure to the coarse dispersion liquid, while cooling the coarse dispersion liquid as necessary in order to suppress air bubble formation.

When applying back pressure to the coarse dispersion liquid, although the back pressure applied to the coarse dispersion liquid may be lowered at once to atmospheric pressure, the pressure is preferably lowered over multiple steps.

Herein, in order to impart shear force on the coarse dispersion liquid and achieve further dispersion of the CNTs, a dispersing system may for example be used that includes a disperser having a structure such as described below.

Specifically, the disperser includes, in order toward an outflow-side from an inflow-side for the coarse dispersion liquid, a disperser orifice having an inner diameter d1, a dispersion space having an inner diameter d2, and a termination section having an inner diameter d3 (where d2>d3>d1).

In this disperser, when the in-flowing coarse dispersion liquid passes through the disperser orifice at high pressure (for example, 10 MPa to 400 MPa, and preferably 50 MPa to 250 MPa), the coarse dispersion liquid is reduced in pressure while becoming a high-flow rate fluid that then flows into the dispersion space. Thereafter, the high-flow rate coarse dispersion liquid that has flowed into the dispersion space flows at high speed inside the dispersion space while receiving shear force. As a result, the flow rate of the coarse dispersion liquid decreases and the CNTs are favorably dispersed. A fluid at a lower pressure (back pressure) than the pressure of the in-flowing coarse dispersion liquid then flows out from the terminal section as a CNT dispersion liquid.

Note that the back pressure can be applied on the coarse dispersion liquid by applying a load to flow of the coarse dispersion liquid. For example, a desired back pressure can be applied on the coarse dispersion liquid by providing a multi-step pressure reducer downstream of the disperser.

As a result of the back pressure of the coarse dispersion liquid being reduced over multiple steps by the multi-step pressure reducer, air bubble formation in the CNT dispersion liquid can be suppressed when the CNT dispersion liquid is finally exposed to atmospheric pressure.

The disperser may be provided with a heat exchanger or a cooling liquid supply mechanism for cooling the coarse dispersion liquid. The reason for this is that by cooling the coarse dispersion liquid that is at a high temperature due to the application of shear force in the disperser, air bubble formation in the coarse dispersion liquid can be further suppressed.

Air bubble formation in the solvent containing the CNTs can also be suppressed by cooling the coarse dispersion liquid in advance, instead of by providing a heat exchanger or the like.

As explained above, the dispersion treatment that brings about a crushing effect can suppress cavitation and can therefore restrict damage to the CNTs caused by cavitation, and in particular damage to the CNTs caused by shock waves when air bubbles burst, which may be a concern in some cases. Additionally, adhesion of air bubbles to the CNTs and energy loss due to air bubble formation can be suppressed, and the CNTs can be uniformly and efficiently dispersed.

One example of a dispersing system having a configuration such as described above is a BERYU SYSTEM PRO (product name) produced by Beryu Corp. The dispersion treatment that brings about a crushing effect can be implemented using a dispersing system such as described above by controlling dispersing conditions as appropriate.

[Viscosity of Carbon Nanotube Dispersion Liquid]

The viscosity of the CNT dispersion liquid is preferably at least 0.001 Pa·s, and more preferably at least 0.01 Pa·s, and is preferably no greater than 0.8 Pa·s, and more preferably no greater than 0.6 Pa·s. The reason for this is that when the viscosity of the CNT dispersion liquid is at least 0.001 Pa·s and no greater than 0.8 Pa·s, the CNTs can be favorably formed into a film in the film formation step described below, properties of the obtained CNT film such as electrical conductivity, thermal conductivity, and mechanical characteristics can be sufficiently improved, and the CNT film can be easily produced. The viscosity of the CNT dispersion liquid can for example be adjusted by altering the blending amount or type of the CNTs and the dispersant.

In the present disclosure, the viscosity of the CNT dispersion liquid can be measured in accordance with JIS K7117-1 using a B-type viscometer, with a temperature of 23° C., an M4 rotor, and a rotational speed of 60 rpm.

<Film Formation Step>

In the film formation step, the solvent is removed from the CNT dispersion liquid described above to form a CNT film. Specifically, the film formation step involves forming the CNT film by removing the solvent from the CNT dispersion liquid using, for example, method (A) or method (B) described below.

(A) A method involving applying the CNT dispersion liquid onto a film formation substrate and then drying the CNT dispersion liquid (B) A method involving filtering the CNT dispersion liquid using a film formation substrate that is porous and then drying the resultant residue It is presumed that since the presently disclosed method for producing a carbon nanotube film uses a plurality of CNTs including one or more CNTs having at least partially collapsed structures, the CNTs become densely entangled to form a reticulated structure in the film formation step, and thus a CNT film can be obtained in which CNTs having excellent characteristics are favorably assembled.

[Film Formation Substrate]

The film formation substrate is not specifically limited and any known substrate may be used in accordance with the intended use of the produced CNT film.

Specific examples of the film formation substrate onto which the CNT dispersion liquid is applied in method (A) include a resin substrate and a glass substrate. Examples of resin substrates that can be used include substrates made of polyethylene terephthalate (PET), polyethylene naphthalate (PEN), polytetrafluoroethylene (PTFE), polyimides, polyphenylene sulfide, aramids, polypropylene, polyethylene, polylactic acid, polyvinyl chloride, polycarbonates, polymethyl methacrylate, alicyclic acrylic resins, cycloolefin resins, and triacetyl cellulose. Examples of glass substrates that can be used include a substrate made of normal soda glass.

Examples of the film formation substrate used to filter the CNT dispersion liquid in method (B) include filter paper and porous sheets made of cellulose, nitrocellulose, alumina, and the like.

[Application]

In method (A), the CNT dispersion liquid can be applied onto the film formation substrate by any commonly known application method. Specific examples of application methods that can be used include dipping, roll coating, gravure coating, knife coating, air knife coating, roll knife coating, die coating, screen printing, spray coating, and gravure offset.

[Filtration]

In method (B), the CNT dispersion liquid can be filtered by the film formation substrate by any commonly known filtration method. Specific examples of filtration methods that can be used include natural filtration, vacuum filtration, pressure filtration, and centrifugal filtration.

[Drying]

The CNT dispersion liquid applied onto the film formation substrate in method (A) or the residue obtained in method (B) can be dried by any commonly known drying method. Examples of drying methods that can be used include hot-air drying, vacuum drying, hot-roll drying, and infrared irradiation. Although no specific limitations are placed on the drying temperature and time, the drying temperature is normally from room temperature to 200° C. and the drying time is normally from 0.1 minutes to 150 minutes.

<Post-Formation Treatment of CNT Film>

A CNT film formed in the manner described above normally contains components of the CNT dispersion liquid, such as the CNTs and the dispersant, in the same ratio as these components are contained in the CNT dispersion liquid. Accordingly, the presently disclosed method for producing a carbon nanotube film may optionally include washing the CNT film formed in the film formation step to remove the dispersant from the CNT film. Removal of the dispersant from the CNT film enables further improvement of CNT film properties such as electrical conductivity.

The washing of the CNT film can be performed by bringing the CNT film into contact with a solvent that can dissolve the dispersant and causing the dispersant in the CNT film to elute into the solvent. No specific limitations are placed on the solvent that can dissolve the dispersant in the CNT film. For example, any of the previously described solvents that can be used as the solvent of the CNT dispersion liquid may be used, and preferably the same solvent as the solvent of the CNT dispersion liquid is used. The CNT film can be brought into contact with the solvent by immersing the CNT film in the solvent or applying the solvent onto the CNT film. Moreover, the CNT film resulting from this washing may be dried by a known method.

Furthermore, the presently disclosed method for producing a carbon nanotube film may optionally include subjecting the CNT film formed in the film formation step to pressing in order to further increase the density of the CNT film. However, in the case of the CNT film produced by the presently disclosed method for producing a carbon nanotube film, favorable assembly of CNTs is achieved to an adequate level in film formation as a result of the presence of the one or more collapsed CNTs. Therefore, from a viewpoint of suppressing deterioration of properties due to damage or destruction of CNTs, it is preferable that pressing is performed with a pressing pressure of less than 3 MPa, and more preferable that pressing is not performed.

(Use of CNT Film)

The presently disclosed CNT film is particularly suitable as a conductive film for a solar cell, a touch panel, or the like.

The presently disclosed CNT film may be used as formed on the film formation substrate or may be used after being peeled from the film formation substrate. Note that the presently disclosed CNT film can optionally be stacked with a known functional layer, such as an overcoating layer, and then be used in various products. Stacking of a functional layer, such as an overcoating layer, on the CNT film can be performed by a known method.

<Touch Panel>

In one specific example, the presently disclosed CNT film may be suitably used as a conductive layer that is formed on a transparent substrate and is a constituent of a touch sensor of a touch panel, such as a capacitive touch panel.

<Solar Cell>

In another example, the presently disclosed CNT film may be used as a conductive layer or catalyst layer that is a constituent of an electrode of a solar cell, such as a dye-sensitized solar cell. More specifically, the presently disclosed CNT film may be used as a conductive layer that is a constituent of a photoelectrode of a dye-sensitized solar cell, or as either or both of a conductive layer and a catalyst layer that is a constituent of a counter electrode (catalyst electrode) of a dye-sensitized solar cell.

EXAMPLES

The following provides a specific explanation of the present disclosure based on examples. However, the present disclosure is not limited to these examples.

Example 1

<CNT Synthesis>

A coating liquid A for catalyst supporting layer formation was prepared by dissolving 1.9 g of aluminum tri-sec-butoxide, used as an aluminum compound, in 100 mL of 2-propanol, used as an organic solvent, and further adding and dissolving 0.9 g of triisopropanolamine, used as a stabilizer.

Additionally, a coating liquid B for catalyst layer formation was prepared by dissolving 174 mg of iron acetate, used as an iron compound, in 100 mL of 2-propanol, used as an organic solvent, and further adding and dissolving 190 mg of triisopropanolamine, used as a stabilizer.

The coating liquid A described above was applied onto the surface of an Fe—Cr alloy SUS430 base plate (produced by JFE Steel Corporation, 40 mm×100 mm, thickness 0.3 mm, Cr 18%, arithmetic average roughness (Ra) approximately 0.59 μm), used as a substrate, by dip coating under ambient conditions of a room temperature of 25° C. and a relative humidity of 50%. Specifically, the substrate was immersed in the coating liquid A and was held in the coating liquid A for 20 s before being pulled up with a pulling-up speed of 10 mm/s. Thereafter, air drying was performed for 5 minutes, heating at a temperature of 300° C. in an air environment was performed for 30 minutes, and cooling was performed to room temperature to form an alumina thin film (catalyst supporting layer) of 40 nm in thickness on the substrate.

Next, the coating liquid B described above was applied onto the alumina thin film on the substrate by dip coating under ambient conditions of a room temperature of 25° C. and a relative humidity of 50%. Specifically, the substrate having the alumina thin film thereon was immersed in the coating liquid B and was held in the coating liquid B for 20 s before being pulled up with a pulling-up speed of 3 mm/s. Thereafter, air drying (drying temperature 45° C.) was performed for 5 minutes to form an iron thin film (catalyst layer) of 3 nm in thickness. In this manner, a catalyst substrate 1 was obtained having the alumina thin film and the iron thin film on the substrate in this order.

The prepared catalyst substrate 1 was loaded into a reaction furnace of a CVD device maintained at a furnace internal temperature of 750° C. and a furnace internal pressure of $1.02 \times 10^5$ Pa, and a mixed gas of 100 sccm of He and 800 sccm of $H_2$ was introduced into the reaction furnace for 10 minutes (formation step). Next, the furnace internal temperature of 750° C. and the furnace internal pressure of $1.02 \times 10^5$ Pa were maintained while supplying a mixed gas of 850 sccm of He, 100 sccm of ethylene, and 50 sccm of $H_2O$-containing He (relative humidity 23%) into the reaction furnace for 8 minutes (growth step).

Thereafter, 1,000 sccm of He was supplied into the reaction furnace in order to purge residual feedstock gas and catalyst activating material. Through the above, an aligned CNT aggregate 1 was obtained. The aligned CNT aggregate 1 that was obtained had a yield of 1.8 mg/cm², a G/D ratio of 3.7, a density of 0.03 g/cm³, a BET specific surface area of 1,060 m²/g, and a carbon purity of 99.9%. The aligned CNT aggregate 1 that had been prepared was peeled from the catalyst substrate 1 to obtain CNTs 1.

<Confirmation of Presence of Collapsed CNTs>

The obtained CNTs 1 were subjected to fullerene insertion treatment by sealing the CNTs 1 in a quartz tube with isolated and purified fullerenes ($C_{60}$) and performing heat treatment at a temperature of 500° C. for 24 hours while maintaining a pressure of $1.07 \times 10^{-3}$ Pa. As a result of observing the CNTs 1 under a transmission electron microscope (TEM) after the fullerene insertion treatment, it was confirmed that single-walled CNTs having collapsed structures were present as illustrated in FIGS. 1 and 2. Furthermore, when the number of collapsed CNTs was determined by TEM observation, it was confirmed that 32 collapsed CNTs were present in 100 CNTs.

<Carbon Nanotube Dispersion Liquid Preparation>

The previously described CNTs 1 were added in an amount of 5.0 g to 500 mL of 5 mass % sodium deoxycholate (DOC) aqueous solution, used as a dispersant-containing solvent, to obtain a coarse dispersion liquid containing DOC as a dispersant. The coarse dispersion liquid containing the CNTs 1 was loaded into a high-pressure homogenizer (product name: BERYU SYSTEM PRO, produced by Beryu Corp.) having a multi-step pressure control device (multi-step pressure reducer) for applying back pressure during dispersion, and the coarse dispersion liquid was subjected to dispersion treatment at a pressure of 100 MPa. Specifically, the CNTs 1 were dispersed by imparting shear force on the coarse dispersion liquid while applying back pressure and, as a result, a CNT dispersion liquid 1 was obtained. Note that in the dispersion treatment, dispersion liquid flowing out from the high-pressure homogenizer was returned to the high-pressure homogenizer, and dispersion treatment was carried out in this manner for 10 minutes. The prepared CNT dispersion liquid 1 had a viscosity of 0.58 Pa·s as measured by a viscometer (TVE-22H produced by Toki Sangyo Co., Ltd.) at a temperature of 23° C. and a rotational speed of 60 rpm.

<Carbon Nanotube Film Formation>

The obtained CNT dispersion liquid 1 was weighed and was then filtered at 0.09 MPa using a vacuum filtration device equipped with a membrane filter. After this filtration, isopropyl alcohol and water were passed through the vacuum filtration device to wash a CNT film formed on the membrane filter, and then air was passed through the vacuum filtration device for 15 minutes. Next, the produced CNT film and the membrane filter were immersed in ethanol and the CNT film was peeled from the membrane filter to obtain a CNT film 1 of 50 μm in thickness. The density of the obtained CNT film 1 was measured to be 0.85 g/cm³. The glossiness of the produced CNT film 1 was measured at 60° using a gloss meter (Gloss Checker produced by Horiba, Ltd., wavelength 890 nm). The measured glossiness was 43. A tensile test (measurement conditions: temperature 20° C., relative humidity 65%, tensing rate 100%/minute) was carried out on the CNT film 1 using a tensile test device (TENSILON). The tensile strength of the CNT film 1 was measured to be 85 MPa as an average value of five measurements. Electrical conductivity of the produced CNT film 1 was measured by a four-probe method using a conductivity meter. The measured surface resistance was 0.67 Ω/sq.

Figure 3A:
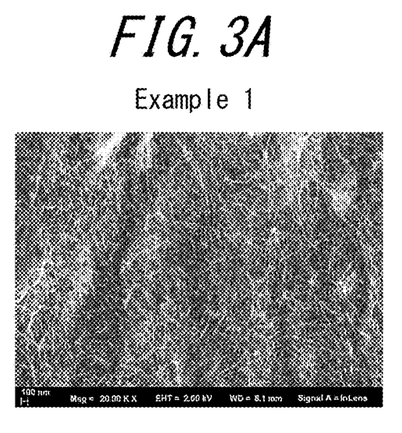
FIGS. 3A and 3C are SEM images of a CNT film produced in Example 1 and FIGS. 3B and 3D are SEM images of a CNT film produced in Comparative Example 2.
Figure 3B:
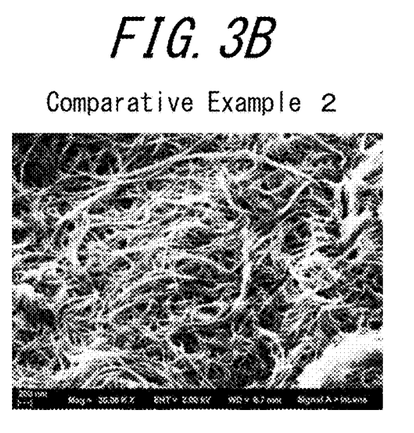
Figure 3C:
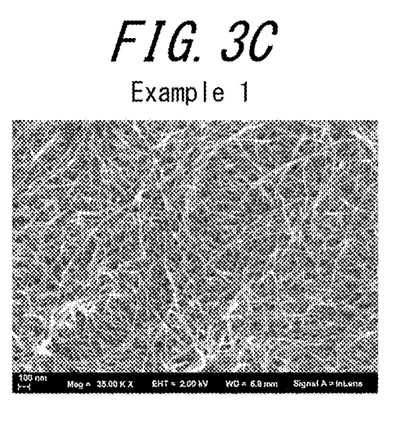

Moreover, the obtained CNT film 1 was observed using a scanning electron microscope (SEM) and it was confirmed that CNTs were favorably assembled as illustrated in FIGS. 3A and 3C. FIG. 3A is an SEM image at ×20,000 magnification and FIG. 3C is an SEM image at ×35,000 magnification.

Example 2

In carbon nanotube dispersion liquid preparation, a CNT dispersion liquid 2 was prepared by the same procedure as in Example 1 with the exception that the 500 mL of 5 mass % sodium deoxycholate (DOC) aqueous solution used as the dispersant-containing solvent was replaced by 500 mL of 0.5 mass % sodium deoxycholate (DOC) aqueous solution, and the additive amount of the CNTs 1 was changed to 0.5 g. Furthermore, a CNT film 2 was produced by the same procedure as in Example 1 with the exception that the CNT dispersion liquid 2 was used. The viscosity of the prepared CNT dispersion liquid 2 was measured to be 0.04 Pa·s by the same method as in Example 1. The produced CNT film 2 had a density of 0.82 g/cm³, a glossiness at 60° of 30, a tensile strength of 65 MPa, and a surface resistance of 0.88 Ω/sq.

Example 3

In CNT synthesis, a catalyst substrate 2 was prepared by the same procedure as in Example 1 with the exception that the pulling-up speed in application of the coating liquid B onto the substrate including the alumina thin film was changed from 3 mm/s to 6 mm/s. An aligned CNT aggregate 2 and CNTs 2 were prepared by the same procedure as in Example 1 with the exception that the catalyst substrate 1 was replaced by the catalyst substrate 2. The aligned CNT aggregate 2 that was obtained had a yield of 1.4 mg/cm², a G/D ratio of 2.1, a density of 0.03 g/cm³, a BET specific surface area of 680 m²/g, and a carbon purity of 99.9%. The presence of single-walled CNTs having collapsed structures among the obtained CNTs 2 was confirmed when the presence of collapsed CNTs was checked in the same way as in Example 1. Furthermore, when the number of collapsed CNTs was determined, it was confirmed that 8 collapsed CNTs were present in 100 CNTs.

In carbon nanotube dispersion liquid preparation, a CNT dispersion liquid 3 was prepared by the same procedure as in Example 2 with the exception that the CNTs 1 were replaced by the CNTs 2. Moreover, a CNT film 3 was produced by the same procedure as in Example 1 with the exception that the CNT dispersion liquid 3 was used. The viscosity of the prepared CNT dispersion liquid 3 was measured to be 0.04 Pa·s by the same method as in Example 1. The produced CNT film 3 had a density of 0.64 g/cm³, a glossiness at 60° of 7, a tensile strength of 59 MPa, and a surface resistance of 2.0 Ω/sq.

Comparative Example 1

In carbon nanotube dispersion liquid preparation, a comparative example CNT dispersion liquid 1 was prepared by the same procedure as in Example 1 with the exception that the CNTs 1 were replaced by multi-walled carbon nanotubes (MWCNTs; Lot. 1232 produced by Nanostructured & Amorphous Materials Inc., BET specific surface area 57 m²/g). It should be noted that collapsed CNTs were not present in the MWCNTs. The viscosity of the prepared comparative example CNT dispersion liquid 1 was measured to be 0.042 Pa·s by the same method as in Example 1. Furthermore, when production of a comparative example CNT film was attempted by the same procedure as in Example 1 with the exception that the comparative example CNT dispersion liquid 1 was used, it was not possible to obtain a CNT film because the film ripped.

Comparative Example 2

<CNT Synthesis>

A sputtering device was used to form a silicon dioxide film (carburizing prevention layer) of 100 nm in thickness on both front and rear surfaces of an Fe—Cr alloy SUS430 base plate (produced by JFE Steel Corporation, 40 mm×100 mm, thickness 0.3 mm, Cr 18%, arithmetic average roughness (Ra) approximately 0.59 μm), used as a substrate. Next, the sputtering device was used to form an aluminum oxide film of 10 nm in thickness and an iron film of 1.0 nm in thickness on only the front surface of the substrate on which the silicon dioxide film had been formed. Through the above, a comparative example catalyst substrate was prepared. Next, a comparative example aligned CNT aggregate and comparative example CNTs were prepared under the same conditions as in Example 1. The comparative example aligned CNT aggregate that was obtained had a yield of 1.9 mg/cm², a G/D ratio of 6.5, a density of 0.03 g/cm³, a BET specific surface area of 1,100 m²/g, and a carbon purity of 99.9%.

<Confirmation of Presence of Collapsed CNTs>

Single-walled CNTs having collapsed structures were not confirmed among the obtained comparative example CNTs when the presence of collapsed CNTs was checked in the same way as in Example 1.

<Carbon Nanotube Dispersion Liquid Preparation>

The comparative example CNTs described above were added in an amount of 1 g to 100 g of isopropyl alcohol and were subjected to dispersion treatment using a stirring device to obtain a coarse dispersion liquid. A comparative example CNT dispersion liquid 2 was prepared by performing ultrasonic irradiation of the coarse dispersion liquid containing the comparative example CNTs for 1 hour, with a power of 300 W and a frequency of 20,000 kHz, using a probe-type ultrasound device (product name: UX300, produced by Mitsui Electric Co., Ltd.). The viscosity of the prepared comparative example CNT dispersion liquid 2 was measured to be 0.005 Pa·s by the same method as in Example 1.

Moreover, a comparative example CNT film 2 was produced by the same procedure as in Example 2 with the exception that the comparative example CNT dispersion liquid 2 was used. The comparative example CNT film 2 had a density of 0.70 g/cm³, a glossiness at 60° of 1, and a surface resistance of 9.4 Ω/sq. The tensile strength of the comparative example CNT film 2 was below the lower limit of measurement.

Figure 3D:
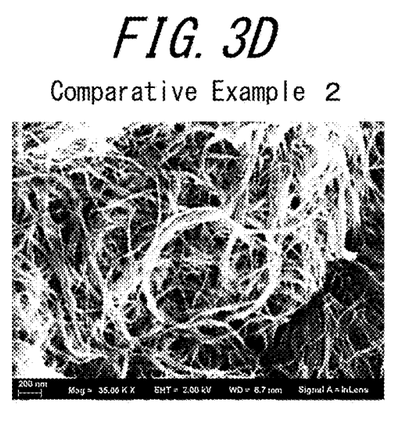

Moreover, the obtained comparative example CNT film 2 was observed using a scanning electron microscope (SEM) and is was confirmed that CNTs were coarsely assembled with both dense and sparse regions as illustrated in FIGS. 3B and 3D. FIG. 3B is an SEM image at ×20,000 magnification and FIG. 3D is an SEM image at ×35,000 magnification.

TABLE 1

| | | Example 1 | Example 2 | Example 3 | Comparative Example 1 | Comparative Example 2 |
|---|---|---|---|---|---|---|
| CNTs | Type | CNTs 1 | CNTs 1 | CNTs 2 | MWCNTs | Comparative example CNTs |
| | BET specific surface area [m²/g] | 1060 | 1060 | 680 | 57 | 1100 |
| | Mass density [g/cm³] | 0.03 | 0.03 | 0.03 | — | 0.03 |
| | Proportion of collapsed CNTs [collapsed CNTs/ 100 CNTs] | 32 | 32 | 8 | — | — |
| Evaluation | Glossiness | 43 | 30 | 7 | — | 1 |
| | Surface resistance (Ω/sq.) | 0.67 | 0.88 | 2.0 | — | 9.4 |
| | Tensile strength (MPa) | 85 | 65 | 59 | — | — |

It can be seen from Table 1 that the CNT films in Examples 1 to 3 each had high glossiness and excellent properties in terms of electrical conductivity and so forth.

INDUSTRIAL APPLICABILITY

According to the present disclosure, a carbon nanotube film can be provided that has excellent properties such as electrical conductivity, thermal conductivity, and mechanical characteristics.

The invention claimed is:

1. A carbon nanotube film comprising:
an assembly of a plurality of carbon nanotubes, and having a film surface glossiness at 60° of at least 5 and no greater than 50, wherein
the plurality of carbon nanotubes includes one or more carbon nanotubes having at least partially collapsed structures.

2. The carbon nanotube film of claim 1, wherein
the one or more carbon nanotubes having at least partially collapsed structures are present in a proportion of at least 5 in 100 carbon nanotubes.

3. The carbon nanotube film of claim 1, wherein
the plurality of carbon nanotubes has a BET specific surface area of at least 600 m²/g.

4. A method for producing the carbon nanotube film according to claim 1, comprising
forming a carbon nanotube film by removing a solvent from a carbon nanotube dispersion liquid containing the solvent, a dispersant, and a plurality of carbon nanotubes including one or more carbon nanotubes having at least partially collapsed structures.

5. The method for producing a carbon nanotube film of claim 4, further comprising
preparing the carbon nanotube dispersion liquid by subjecting a coarse dispersion liquid containing the plurality of carbon nanotubes, the dispersant, and the solvent to dispersion treatment that brings about a cavitation effect or a crushing effect in order to disperse the plurality of carbon nanotubes.

* * * * *